United States Patent
Sinop et al.

(10) Patent No.: US 7,822,274 B2
(45) Date of Patent: Oct. 26, 2010

(54) BANDED GRAPH CUT SEGMENTATION ALGORITHMS WITH LAPLACIAN PYRAMIDS

(75) Inventors: Ali Kemal Sinop, Princeton, NJ (US); Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 986 days.

(21) Appl. No.: 11/638,224

(22) Filed: Dec. 13, 2006

(65) Prior Publication Data

US 2007/0165949 A1    Jul. 19, 2007

Related U.S. Application Data

(60) Provisional application No. 60/759,415, filed on Jan. 17, 2006.

(51) Int. Cl.
*G06K 9/00* (2006.01)
*G06K 9/34* (2006.01)

(52) U.S. Cl. ..................... 382/173; 362/131
(58) Field of Classification Search ............. 382/128, 382/173, 180, 199, 284, 298, 131
See application file for complete search history.

(56) References Cited

U.S. PATENT DOCUMENTS

| 5,710,830 A * | 1/1998 | Holeva ............ 382/173 |
| 2005/0163375 A1* | 7/2005 | Grady ............ 382/180 |

* cited by examiner

*Primary Examiner*—Duy M Dang
(74) *Attorney, Agent, or Firm*—Donald B. Paschburg; F. Chau & Associates, LLC

(57) ABSTRACT

A process for segmenting an object of interest from background, comprising: obtaining a master, high-resolution image of an object disposed within a background; applying a first band graph cut process to the master image generating a second image with the object being segmented from the background to a first approximation; and, comparing the second image with the master image to produce a comparison image with pixels identified by the comparison to be background images being removed from the comparison image.

8 Claims, 4 Drawing Sheets

US 7,822,274 B2

BANDED GRAPH CUT SEGMENTATION ALGORITHMS WITH LAPLACIAN PYRAMIDS

CROSS REFERENCE TO RELATED APPLICATION

This application claims priority from U.S. Provisional application No. 60/759,415 filed Jan. 17, 2006, which is incorporated herein by reference.

TECHNICAL FIELD

This invention relates generally to image processing, and more particularly to multilevel image segmentation.

BACKGROUND AND SUMMARY

As is known in the art, digital image processing is becoming increasingly popular as digital imaging devices continue to become more powerful. For example, digital cameras can generate pictures having 10 million pixels, and Computed Tomography (CT) scanners may produce volume data having more than 100 million voxels. Processing these images places a large computational burden on the various devices that perform image processing.

One type of processing that is often performed on image data is segmentation, whereby a boundary is determined between different portions of the image. For example, in digital photography, it is often desirable to define a boundary between a main object (i.e., foreground) and background, in order to segment out the main object. After the main object is segmented, the main object and background may be processed separately. Similarly, in the medical imaging field, it is often desirable to segment out a particular object, or portion of an object, from a CT scan image. For example, in the case of a CT scan of a human heart, it may be desirable to segment out a portion of the heart (e.g., left atrium) in order to allow a physician to more easily analyze the image. One example of segmentation is illustrated in FIG. 1 which shows an image 100. Assume that the object of interest is a human heart 102 with the remaining portion of the image being considered background. A desirable segmentation is one which provides a boundary between the object of interest, here the heart 102, and the remaining background portion. Such a boundary is shown in FIG. 1 as dotted line 104. Thus, an appropriate segmentation process would generate boundary 104 between the object of interest (i.e., foreground) 102 and the background.

One well known technique for image segmentation is the use of graph cuts, as described in Y. Boykov and M. Jolly, Interactive Graph Cuts for Optimal Boundary & Region Segmentation of Objects in N-D Images, Proceedings of International Conference on Computer Vision, Vol. 1, July 2001, Vancouver, Canada, pp 105-112. As will be described in further detail below, the graph cuts technique is an interactive segmentation technique that divides an image into two segments, an object and background. A user imposes constraints for the segmentation by indicating by seeds certain pixels that are part of the object and certain pixels that are part of the background. The image is then automatically segmented using graph cuts to find the globally optimal segmentation of the image. It is to be noted that the generic term "image" used herein is intended as pertaining to data volumes as well.

More particularly, the Graph Cuts method performs at interactive speeds for smaller images/volumes, but an unacceptable amount of computation time is required for the large images/volumes common in medical applications. The Graph Cuts algorithm inputs two user-defined "seeds" (or seed groups) indicating samples of the foreground object and the background. The algorithm then proceeds to find the max-flow/min-cut between these seeds, viewing the image as a graph where the pixels are associated with nodes and the edges are weighted to reflect image gradients. Although standard max-flow/min-cut routines may be used for this computation, faster specialty algorithms for the domain of image segmentation have been developed, see a paper by Y. Boykov and V. Kolmogorov, "An experimental comparison of min-cut/max-flow algorithms for energy minimization in vision" IEEE PAMI 26(9) 2004. 1124-1137.

Part of the popularity of the Graph Cuts algorithm also stems from the statistical interpretation of the approach as the minimization of a certain Markov Random Field, see papers by: D, Greigm, B. P. Seheult, "Exact maximum a posteroiri estimation for binary images", Journal of the Royal Statistical Society, Series B 51(2) 1989 271-279; and Boykpv, Y., Veeksler, O., Zabih. R., "A new algorithm for energy minimization with discontinuities: In Pelillo-M., H.E.R. ed "Energy Minimization Methods in Computer Vision and Pattern Recognition. Second International Workshop, EMMCVPR'99, York, UK, Jul. 25-29, 1999 (1999), 205-270. Additionally, the segmentation results are straightforward to predict and intuitive to use since the algorithm always finds the segmentation boundary at the location of the minimum cut (or surface).

The max-flow/min-cut algorithm described in the above referenced paper by Y. Boykov and V. Kolmogorov, "An experimental comparison of min-cut/max-flow algorithms for energy minimization in vision" IEEE PAMI 26(9) 2004. 1124-1137 makes a great computational advance over the conventional methods for computing max-flow/min-cut. However, for high-resolution images or medical volumes, the computational burden is still too large for the algorithm to operate at an interactive speed. For example, it has been reported that over six minutes were required to segment a medical volume of size 256×256×185. This large computational burden for the Graph Cuts algorithm prompted the introduction of the Banded Graph Cuts (BGC) algorithm described below.

More particularly, a heuristic referred to as Banded Graph Cuts (BGC) has recently been introduced for producing fast, low-memory approximations to graph cuts, see a paper by H. Lombaert, Y Sun, L. Grady and C. Xu, entitled "A multilevel banded graph cuts method for fast image segmentation", published in Proceedings of ICCV 2005, volume I, pages 259-265, Beijing, China, 2005, IEEE 1.23 and published U.S. Patent Application Pub. No. 2006/015934 A1, published Jul. 20, 2006, application Ser. No. 11/313,102 filed Dec. 20, 2005, entitled "Multilevel Image Segmentation", inventors Yiyong Sun, Herve Lombaert, Leo Grady and Chenyang Xu, assigned to the same assignee as the present patent application, the entire subject matter thereof being incorporated herein by reference. The BGC method produces fast, low-memory approximations to graph cuts wherein a hierarchical image pyramid is constructed by repetitively downsampling (i.e., reduced resolution or coarsening of) the original, highest resolution image a specified number of times. Foreground (i.e., object of interest) and background seeds on the original high-resolution image are also downsampled. In the smallest image (the one width the least resolution and hence fewest pixels), a full graph cut algorithm is run, and the resulting segmentation is iteratively propagated toward the fine-level resolution using any number of standard, well-known methods. In general, each pixel of the coarse-level image is identified with several pixels on the fine-level image which are all given the same segmentation label as the associated coarse-level pixel. Since the segmentation is performed with the fewest number pixels, the computation time is reduced compared to segmentation with the original highest-resolution image. For each level of downsampling, the boundary of the segmentation is projected onto the next, fine-resolution, level while being dilated (i.e., the original boundary is converted to a "band") by a specified amount d to create a band around the object. The graph cut algorithm is then run for this sparse (i.e., downsampled) graph. Hence, a tradeoff between the memory/time requirements and segmentation accuracy (i.e., inaccuracies resulting from the processing of downscaled data) is introduced through specification of the maximum pyramid level (i.e., the number of downscalings) and dilation size. Although this heuristic greatly reduces the memory and time consumption, in some applications it is desirable to detect thin structures (i.e., objects) such as vessels in medical imaging data.

Thus, the goal of the BGC algorithm was to provide the same cut (segmentation) of the native Graph Cuts algorithm by introducing a multilevel scheme for the computation. Although the BGC algorithm is not guaranteed to provide the minimum graph cut, it was convincingly shown that the (near) minimal graph cut was returned for practical problems in which the segmentation target was "blob-like". Despite this limitation to "blob-like" segmentation targets, the BGC algorithm produces computational speeds over an order of magnitude faster than those obtained when employing conventional Graph Cuts (i.e., using the algorithm of described in the above referenced paper by Y. Boykov and V. Kolmogorov, "An experimental comparison of min-cut/max-flow algorithms for energy minimization in vision" IEEE PAMI 26(9) 2004. 1124-1137 on the full graph.

The BGC algorithm is not the only approach to increasing the computational efficiency of Graph Cuts. The Lazy Snapping algorithm described in a paper by Li, Y. et. al. "Proceedings of ACM SIGGRAPH 2004 (2004) 303-308 performs a pre-segmentation grouping of the pixels using a watershed transform described by Roerdink et al., "The watershed transformation: Definitions, algorithms, and parallelization strategies", Fund. Information 41 (2002) 187-228 and treats each watershed basin as a supernode. Graph Cuts is then run on the graph of supernodes. By drastically reducing the number of nodes in the graph, this approach greatly increases the speed of Graph Cuts in practice. However, the computational savings are more difficult to predict with this approach since the number of supernodes is highly image dependent. Additionally, the authors of this approach offer no characterization of when to expect this coarsening approach to succeed or fail to produce the same cut given by full-resolution Graph Cuts.

The inventors have recognized that a modification of the BGC algorithm will allow for the accurate segmentation (relative to full-resolution Graph Cuts) of thin-objects while preserving the computational advantages of BGC. The modification is born of the inventor's observation that thin structures are lost as a result of the coarsening operation involved in BGC. This modification is based upon the use of a difference image when coarsening to identify thin structures that may be included into the band during the segmentation. More particularly, the inventors incorporate a Laplacian pyramid described in as paper by Burt, P. J., Adelson, E. H entitled "The Laplacian pyramid as a compact image code. IEEE Transactions on Communications" published in COM-31(4) (1983) 532-540 to recover this lost information and extend the band such that high-threshold pixels are included. In this manner, the additional computational burden is slight but thin structures are recovered. The extra computational burden comes only from considering a small number of additional pixels in the band and by computation of the Laplacian pyramid, which need not be computed explicitly and therefore requires simply an additional linear-time pass over the image.

The invention is an improvement in the BGC algorithm that preserves its computational advantages, but produces segmentations much closer to Graph Cuts when the segmentation target contains thin structures. This modification is based upon the use of a difference image when coarsening to identify thin structures that may be included into the band during the segmentation. The modification of the BGC algorithm allows for the accurate segmentation (relative to full-resolution Graph Cuts) of thin objects while preserving the computational advantages of BGC. The modification is born of the observation that thin structures are lost as a result of the coarsening operation involved in BGC. The invention uses a Laplacian pyramid to recover this lost information and extend the band such that high-threshold pixels are included. In this manner, the additional computational burden is slight but thin structures are recovered. The extra computational burden comes only from considering a small number of additional pixels in the band and by computation of the Laplacian pyramid, which need not be computed explicitly and therefore requires simply an additional linear-time pass over the image.

In accordance with the present invention, a process is provided for segmenting an object of interest from background, the process includes:

1) Obtaining a high-resolution (i.e., original or master) image, of an object of interest disposed in background.

2) Using an outside process (e.g., a user) to partial label the image with some pixels being labeled "object", other pixels being labeled "background" and still others (most) being unlabeled. This initial partial labeling is referred to as "seeds".

3) Downsampling (i.e., coarsening or reducing in resolution) the partially labeled high-resolution image, both the image intensities and the partial labeling, to a coarse version of both.

4) Performing a "Graph Cuts" algorithm on the coarsen image to convert this partial labeling on the coarse image into a full labeling of the coarse image. That is, the "Graph Cuts" algorithm inputs the partial labeling and produces a full labeling. That is, the "Graph Cuts" algorithm results in previously unlabeled pixels being labeled as either background or object.

5) Generating from the coarse labeling and coarse image, a new, fine-level (high-resolution) image with all pixels being labeled. However, due to the information lost in the coarsening process, and there is uncertainty about this labeling. So, the process converts this full labeling to a partial labeling in order to reflect this uncertainty by the following process:

A) Any pixels near the point where the labels is switch from object to background (i.e., the boundary) become unlabeled (this is referred to as the "banded" part)

B) A comparison is made between the pixels in the new fine-level image to the corresponding pixels in the original (master) image and anywhere there is a significant discrepancy in the intensity between two corresponding pixels, the labeling associated with the pixel is changed to "unlabeled". The result is a partially labeled image of high-resolution.

6) The process runs the Graph Cuts algorithm here to produce a fully labeled, high-resolution image.

It should be understood that the initial partial labeling (the "seeds") is usually extremely small (i.e., almost all pixels are unlabeled), but the partial labeling at the end (step 6) is very large (i.e., almost all pixels are labeled), so "Graph Cuts" can fill in the missing labels much faster now. However, if there is more than one level (because the first coarsened image is not low-resolution enough), then this process is repeated for each level, i.e., A full labeling is inherited from the coarse level, but it is converted into a partial labeling by removing the labels of pixels that we are unsure about and running "Graph Cuts" again to produce a full labeling at this level.

In one embodiment, a process for segmenting an object of interest from background, comprises: obtaining an original, high-resolution image of an object of interest disposed in background with seeds on the object being labeled as object pixels and seeds on the background being labeled background pixels and with uncertain pixels remaining unlabeled; reducing the resolution of the labeled image; performing graph cuts on the reduced resolution, labeled image; performing segmentation on the reduced resolution, labeled image; producing a band around a fine boundary of the unlabeled pixels; labeling all pixels interior to the band as foreground pixels and pixels exterior of the band as background pixels; subtracting the labeled image from the original image; if the magnitude of any pixel in the subtracted image exceeds a predetermined threshold, the label, if any, of that pixel is removed; performing a graph cut again to label all unlabeled pixels; and repeating the above until a predetermined degree of resolution is achieved in an image segmenting the object from the background.

In accordance with the present invention, a master high-resolution image with an object of interest disposed in a background is identified by placing foreground seeds on the object and background seeds on the background. The master high-resolution image is coarsened (i.e., the resolution thereof is reduced). The object in the coarsened image is segmented in a low-resolution segmentation image to a first approximation due to the coarsening process and with relatively thin features in the object being reduced by the coarsening. The low-resolution segmentation image is increased to a high-resolution image (i.e., upsampled) with a band of unmarked pixels around the object. The resulting image with the object segmented is then upsampled to the resolution level of the master image. The upsampled, image is compared with the master high-resolution image with the relatively thin features in the object in the master high-resolution image being identified as having pixels with a large magnitude difference from the corresponding pixels in upsampled, augmented image, such larger magnitude pixels being added to the upsampled, augmented image to an increased approximation. The process is repeated until the desired segmentation approximation is achieved.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
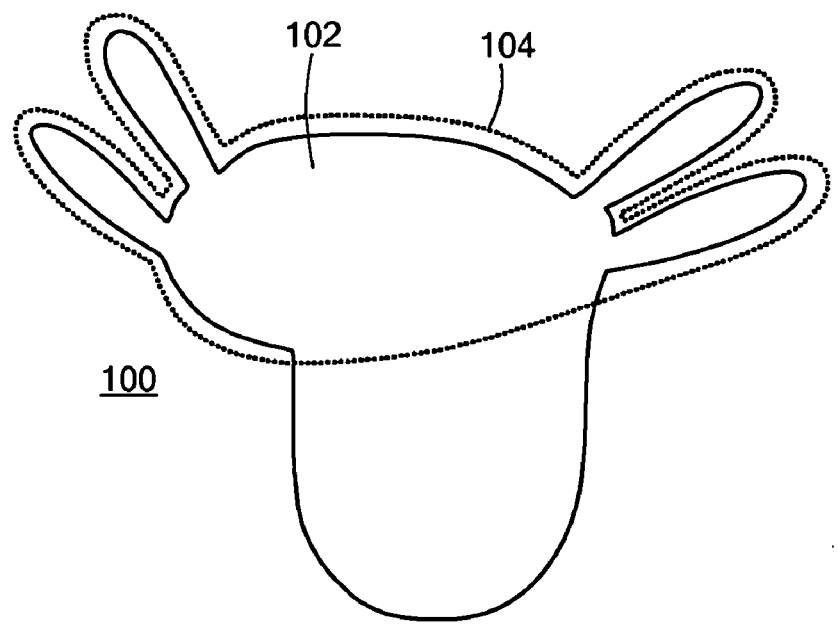
FIG. 1 shows an example of image segmentation.
Figure 2:
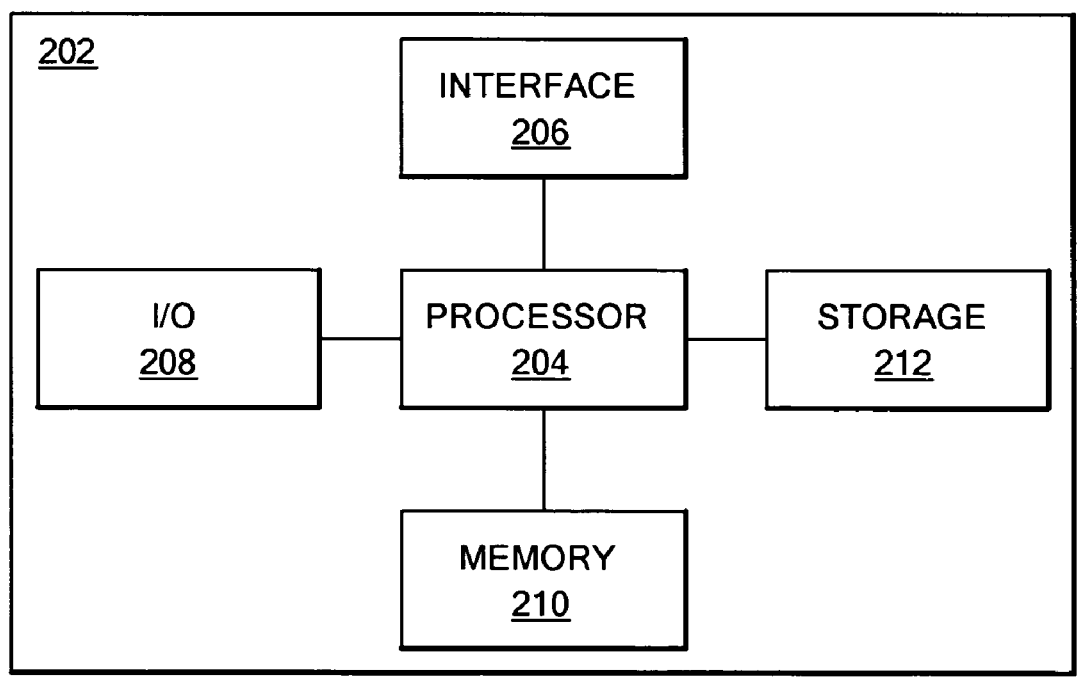
FIG. 2 is a high-level block diagram of a computer which may be used to implement the present invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk, optical disk, or any other computer readable medium) and loaded into memory 210 when execution of the computer program instructions is desired. Memory 210 may also be used to store data used during the various steps of the method. Computer 202 also includes one or more interfaces 206 for communicating with other devices (e.g., locally or via a network). Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Further, in various implementations, the functions described herein may be performed on a dedicated apparatus, or the functions may be part of a device that performs other functions as well.

Figure 3:
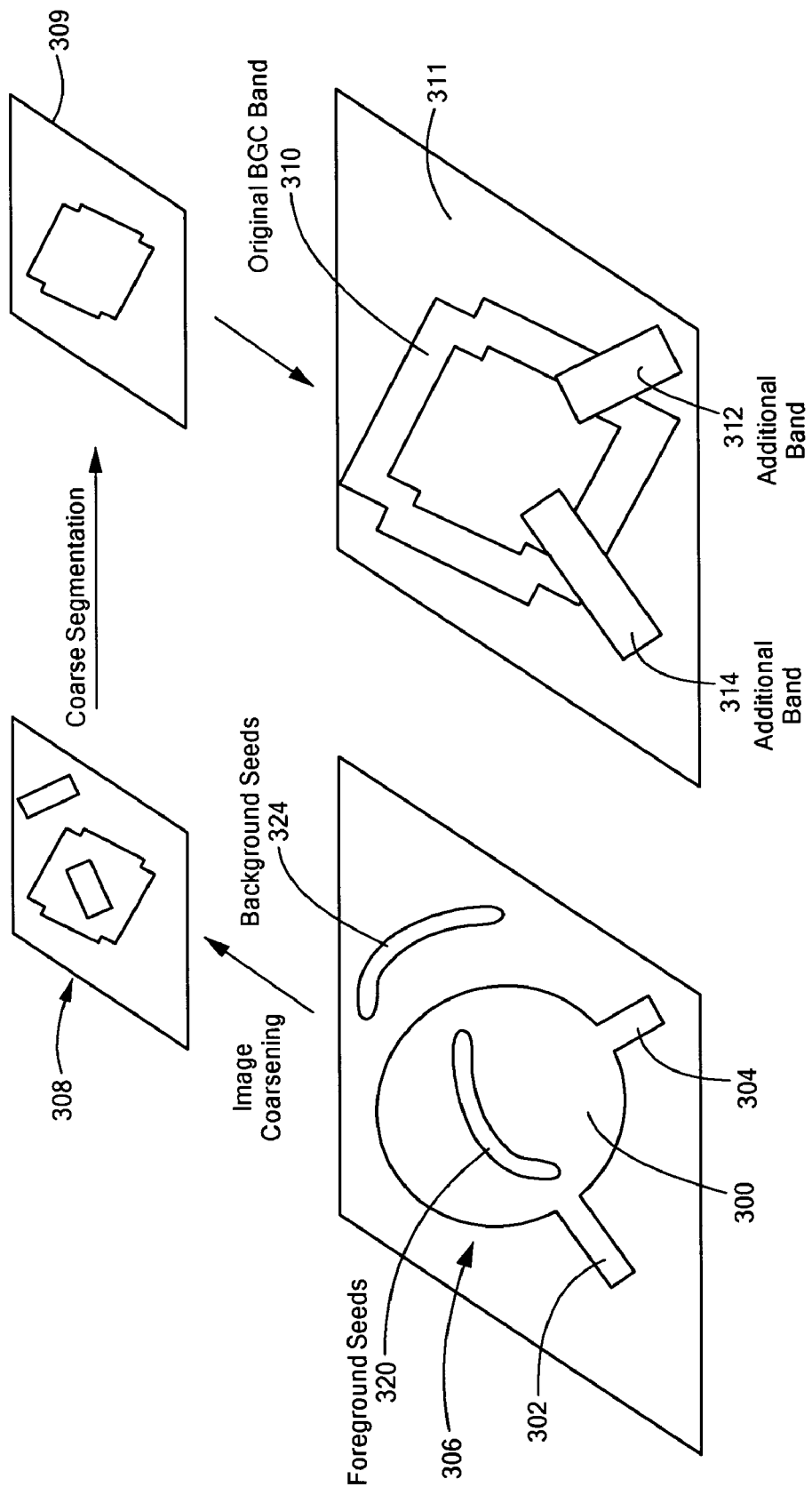
FIG. 3 is a diagram useful in understanding the segmentation method according to the invention.

The present invention provides a multilevel banded graph cut (BGC) method for fast image segmentation using BGC modified in a manner to be described to enable accurate segmentation of relatively thin objects such as blood vessels. More particularly, FIG. 3 illustrates the entire process. An initial circle 300 with two thin attached structures 302, 304 (e.g., representing an idealized organ fed with blood vessels) is to be segmented using the indicated seeds. First, this image 306 is coarsened and segmented into image 305, but the "vessels" are not properly segmented due to the coarsening process. When upsampling, the band 310 is augmented by the pixels crossing threshold α (indicated by the crosshatch region). Now, when the segmentation is performed the "vessels" 302, 304 will be included.

More particularly, the initial circle 300 with two thin attached structures (e.g., vessels 302, 304) to be segmented using the foreground seeds 320 and background seeds 324. First, the image/seeds are coarsened, during which the thin structures are lost. The segmentation is then performed on the coarse level, 308. The resulting segmentation 309 is then upsampled to image 312, and the original BGC band 310 is computed. This band 310 is augmented to include the thin structures 312, 314 as found by pixels with a large magnitude in the difference image, the difference between the pixels in the image 306 and the corresponding pixels in image 311 of the Laplacian pyramid.

Figure 4:
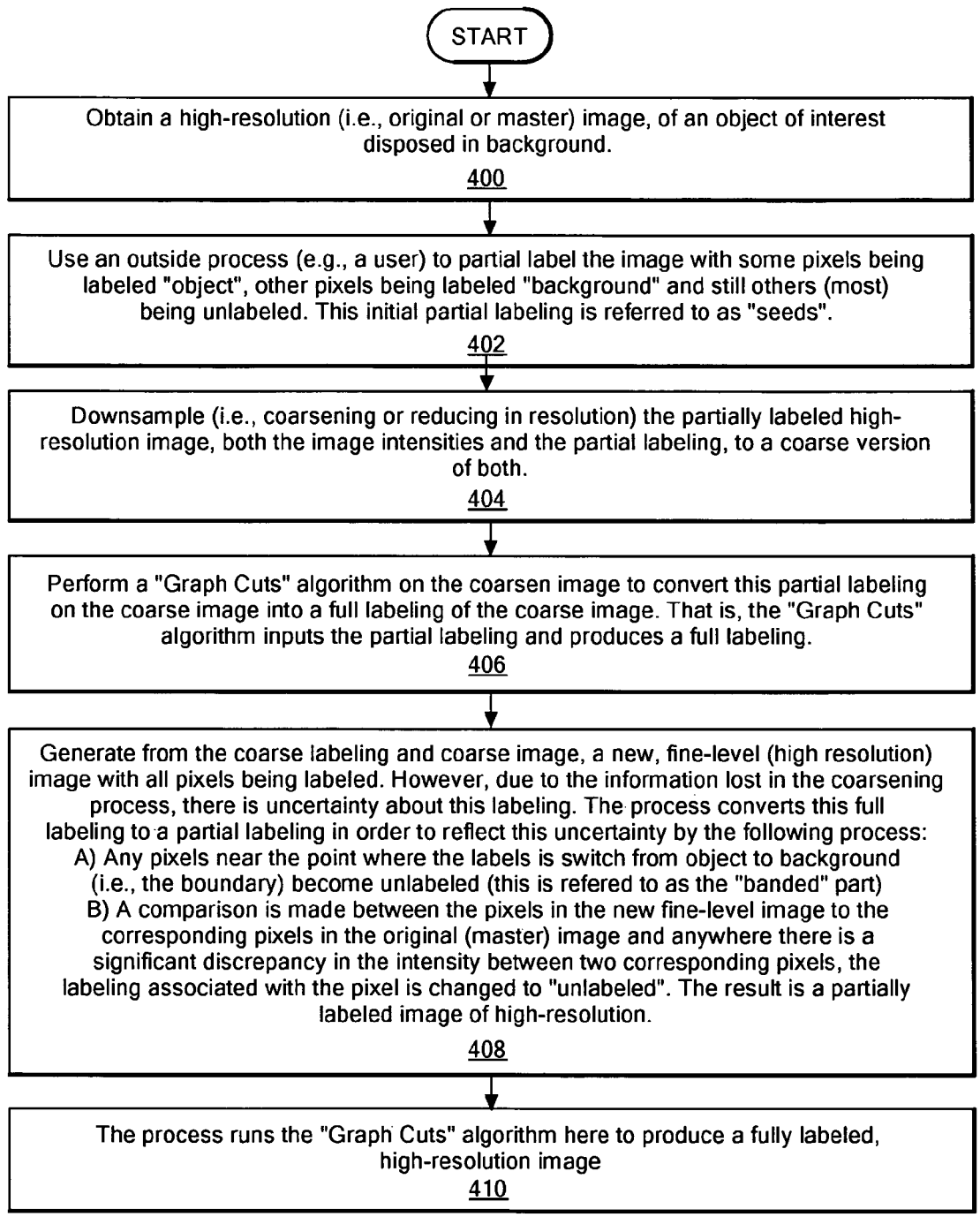
FIG. 4 is a flowchart showing the steps performed in accordance with an embodiment of the invention.

More particularly, and referring also to FIG. 4, the process includes:

1) Obtaining a high-resolution (i.e., original or master) image, of an object of interest disposed in background (Step 400).
2) Using an outside process (e.g., a user) to partial label the image with some pixels being labeled "object", other pixels being labeled "background" and still others (most) being unlabeled. This initial partial labeling is referred to as "seeds" (Step 402).
3) Downsampling (i.e., coarsening or reducing in resolution) the partially labeled high-resolution image, both the image intensities and the partial labeling, to a coarse version of both (Step 404).
4) Performing a "Graph Cuts" algorithm on the coarsen image to convert this partial labeling on the coarse image into a full labeling of the coarse image. That is, the "Graph Cuts" algorithm inputs the partial labeling and produces a full labeling (Step 406). That is, the "Graph Cuts" algorithm results in previously unlabeled pixels being labeled as either background or object.
5) Generating from the coarse labeling and coarse image, a new, fine-level (high-resolution) image with all pixels being labeled. However, due to the information lost in the coarsening process, and there is uncertainty about this labeling. So, the process converts this full labeling to a partial labeling in order to reflect this uncertainty by the following process (Step 408):
   A) Any pixels near the point where the labels is switch from object to background (i.e., the boundary) become unlabeled (this is referred to as the "banded" part)
   B) A comparison is made between the pixels in the new fine-level image to the corresponding pixels in the original (master) image and anywhere there is a significant discrepancy in the intensity between two corresponding pixels, the labeling associated with the pixel is changed to "unlabeled". The result is a partially labeled image of high-resolution.
6) The process runs the "Graph Cuts" algorithm here to produce a fully labeled, high-resolution image (Step 410).

It should be understood that the initial partial labeling (the "seeds") is usually extremely small (i.e., almost all pixels are unlabeled), but the partial labeling at the end (step 6) is very large (i.e., almost all pixels are labeled), so "Graph Cuts" can fill in the missing labels much faster now. However, if there is more than one level (because the first coarsened image is not low-resolution enough), then this process is repeated for each level, i.e., A full labeling is inherited from the coarse level, but it is converted into a partial labeling by removing the labels of pixels that we are unsure about and running "Graph Cuts" again to produce a full labeling at this level.

Figure 5:
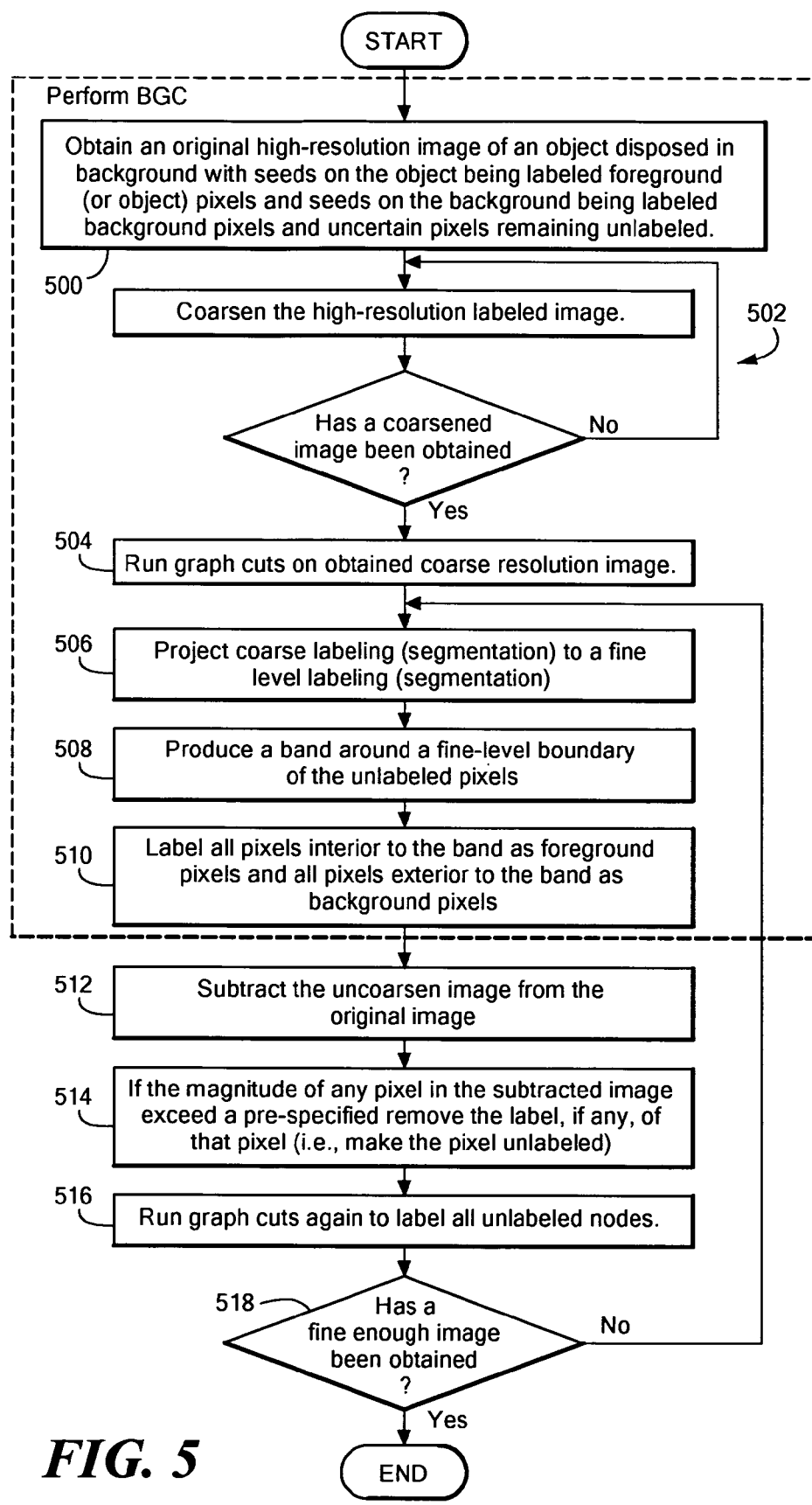
FIG. 5 is a flowchart showing the steps performed in more detail in accordance with an embodiment of the invention.

More particularly, referring to FIG. 5, the process performs a BGC, by obtaining an original, high-resolution image of an object of interest disposed in background with seeds on the object being labeled as foreground (i.e., object pixels) and seeds on the background being labeled background pixels and with uncertain pixels remaining unlabeled, Step 500. Next, the process coarsens or reduces the resolution of the libeled image, Step 502. Next the process performs graph cuts on the coarsened labeled image, Step 504.

Next, the process projects coarse labeling (segmentation) to a fine level, i.e., high-resolution level) labeling (segmentation) i.e., performs segmentation on the coarsened image, Step 506. Next, the process produces a band around a fine boundary of the unlabeled pixels, Step 508. Next, the process labels all pixels interior to the band as foreground pixels and pixels exterior of the band as background pixels, Step 510.

Having competed the BGC process, the process subtracts the uncoarsened image produced by the BGC process and subtracts it from the original image, Step 512. If the magnitude of any pixel in the subtracted image exceeds a predetermined threshold, the label, if any, of that pixel is removed, i.e., the pixel becomes unlabelled, Step 514. The process performs a graph cit again to label all unlabeled pixels, Step 516. The process repeats until a predetermined degree of resolution is achieved in an image segmenting the object from the background, Step 518.

BGC

The BGC method includes three stages: coarsening (i.e., reducing image resolution), initial segmentation, and uncoarsening (i.e., increasing image resolution). More particularly, the method performs segmentation at various resolution levels in order to identify boundaries between an object and background, and propagates the segmentation solution from lower levels to higher levels. Advantageously, segmentations after the first level segmentation level are only performed on a portion of the image. More particularly, segmentations after the first level are performed on the portion of the image identified by the boundary of the prior level segmentation. By performing the higher resolution segmentations in only that position of the image that needs to be refined (e.g., the boundary between the image and the background) significantly less computing resources are used as compared to the prior art approaches. This multilevel banded approach makes it possible to achieve high quality segmentation results on large data sets with faster speed and less memory consumption, thus allowing it to be used in a wider range of applications where high performance segmentation of large image data sets is required.

Starting with a full resolution image, the first step is to generate a reduced resolution image. The reduced resolution image is then segmented to identify a boundary between an object and the background of the image. Next, a portion of an increased resolution image is generated. The portion that is generated is based upon the boundary identified. Thus, the entire higher resolution image is not needed. Only a portion as identified by the previously identified boundary. Then, the generated portion of the increased resolution image is segmented in order to generate a refined boundary in the increased resolution image. The process may be iterative, each time performing segmentation on a higher resolution image, until a boundary having a desired resolution is generated. Thus, by performing multilevel segmentation, segmentation is performed in stages, whereby the higher resolution segmentations are only performed on a portion of the image, thus reducing memory and computational requirements.

The segmentation performed may be segmentation in accordance with the graph cuts algorithm described in Y. Boykov and M. Jolly, Interactive Graph Cuts for Optimal Boundary & Region Segmentation of Objects in N-D Images, Proceedings of International Conference on Computer Vision, Vol. 1, July 2001, Vancouver, Canada, pp 105-112, which is hereby incorporated herein by reference. That algorithm will be described briefly herein as follows. An N-dimensional (N-D) image can be specified by a pair (P,I) consisting of a finite discrete set P of N-D points (pixels in 2D and voxels in 3D), and a mapping I that maps each point p in P to a value I(p) in some arbitrary value space. From a given image, a weighted undirected graph $G=(V,E,W)$ can be constructed that consists of nodes (vertices) $v \in V$, edges $e \in E$, and nonnegative weights (costs) $w \in W$. There are two special nodes in V: a source S node specifying the "object" terminal and a sink T node specifying the "background" terminal. The remaining nodes in V form a subset U=V/{S,T} where each node u∈U uniquely identifies an image point in P. The set of edges E consist of two types of undirected edges: n-links (neighborhood links) and t-links (terminal links). Each image node u∈U has two t-links {u, S} and {u, T} directly connected to the terminal S and T, respectively. However, n-links are completely determined by the neighborhood system used (e.g., 4- or 8-neighborhood system in 2-D and 6-, 18-, or 26-neighborhood system in 3D). It is noted that larger neighborhood systems typically yield better image segmentation results, but at the expense of both increased computation time and memory consumption.

The segmentation of an image into object and background, known also as hard segmentation, can be expressed as a binary vector $A=(A_1, \ldots, A_u, \ldots, A_{|U|})$, where the element $A_u$ gives the binary segmentation label of an image point identified by the node u. A segmentation A can be uniquely determined by a cut C on the graph G, where the cut C is defined as a subset of edges in E such that the terminals become separated on the induced graph G(C)=(V, E/C). Hence the image segmentation problem can be solved as a minimum graph cut problem on the following energy function $$\hat{C} = \underset{C \in F}{\mathrm{argmin}} \sum_{e_{ij} \in C} w_{ij} \qquad (1)$$

where $e_{ij}$ denotes the edge e spanning between the nodes $v_i$, $v_j \in V$, $w_{ij}$ denotes the weight assigned to the edge $e_{ij}$, and F denotes the set of all feasible cuts.

Assume that O and B denote the subsets of image nodes marked as object and background seeds by the user, respectively. Then the weight $w_{ij}$ for the graph is given by $$w_{ij} = \begin{cases} \exp\left(-\frac{(I_i - I_j)^2}{2\sigma^2}\right) / dist(u_i, u_j) & u_i, u_j \in U, \\ MAX & u_i \in O, u_j = S, \\ MAX & u_i \in B, u_j = T, \\ 0 & \text{otherwise} \end{cases} \qquad (2)$$

where dist $(u_i, u_j)$ is the Euclidean distance between image points $p_i$ and $p_j$ identified by nodes $u_i$ and $u_j$, respectively, $I_i=I(p_i), I_j=I(p_j)$, and MAX is a very large positive constant. This energy penalizes cuts that pass through homogeneous regions and encourages cuts that pass through places where intensity discontinuity is large. The constant parameter σ can be chosen empirically or estimated as a standard deviation over an image sample.

Thus, the BGC method includes three stages: coarsening (i.e., reducing image resolution), initial segmentation, and uncoarsening (i.e., increasing image resolution).

During the coarsening stage, a sequence of smaller images $(I^0, I^1, \ldots, I^K)$, are constructed from the original image $I^0$ such that the size constraint $M_n^k \leqq M_n^{k-1}$ is satisfied for each dimension n=1, ..., N, and each level k=1, ..., K, respectively, where M represents one of the dimensions of the image volume. Note that this constraint does not require the size in each dimension to be reduced simultaneously. (The image may be the result of coarsening of a prior image (not shown) from level K−2.) Thus, image is a reduced resolution image.

In additional to image coarsening, the location of the object seeds and background seeds are also coarsened. The object and background seeds are provided as user input, for example by a user identifying the seed points by mouse clicks, or mouse drags. The seed coarsening operator must satisfy the causality constraint so that the discrete topology of both the object and background seed regions is preserved throughout all levels, i.e., the number of connected object and background seed regions must be preserved. Therefore, different coarsening operators should be chosen for coarsening the image and the seeds. In an advantageous embodiment, the image is coarsened using either a weighted mean filter followed by a down sampling of 2 operation, or a down sampling of 2 operation. An ad-hoc seed location coarsening operator is chosen such that the causality constraint is satisfied.

The second stage is the initial segmentation of the coarsest image $I^K$. First, a coarse graph $G^K=(V^K,E^K,W^K)$ is constructed for $I^K$ as described above. Next, the minimum cut $C^K$ of the coarse graph $G^K$ is determined, also as described above. This minimum cut yields a segmentation on the image $I^K$.

During the uncoarsening stage, a binary boundary image $J^k$ is generated to represent all the image points that are identified by the nodes in the cut $C^k$, k∈{1, ..., K}, and to project these identified image points onto a higher resolution boundary image $j^{k-1}$ at level k−1 using an image uncoarsening operator. It is noted that the uncoarsening operator not be the dual operator of the image coarsening operator used in the first stage due to the binary nature of the boundary image. In an advantageous embodiment, the uncoarsening operator is defined as follows:

$$J^{k-1}(p)=J^K(\alpha(p)), \qquad (3)$$

where $p=(p_1, p_2, \ldots, p_N)$ is an N-D point and $\alpha(p)=(\alpha_1(p_1), \alpha_2(p_2), \ldots, \alpha_n, (p_N))$ is the reduction mapping used in the coarsening phase to reduce the dimension size under the size constraint.

The resulting boundary image $J^{k-1}$ contains a narrow band that bounds the candidate boundaries of objects to be extracted from $I^{k-1}$. The width of the band may be controlled by an optional dilation of the band by a distance d≧0. The dilation distance parameter plays an important role. If d is small, the algorithm may not be able to recover the full details of objects with high shape complexity or high curvature. On the other hand, if d is large, the computational benefits of banded graph cuts will be reduced and the wider band may also introduce potential outliners far away from the desired object boundaries. In an advantageous embodiment, choosing d=1 is a good compromise between accuracy and performance for most of real-world 2D and 3D images.

The graph $G^{k-1}$ is then constructed using only the nodes inside the band from the boundary image $J^{k-1}$. The band's outer layer is used as the new background seeds B and the band's inner layer are used as the new object seeds O. In the degenerated case, where the band contains no inner layer due to either segmenting small objects or using large band width, the coarsened object seeds at level k−1 are used as the object seeds O. The coarsened object seeds are guaranteed to lie inside objects to be segmented. Next, weights are assigned to all edges according to equation (2).

Once the graph $G^{k-1}$ is constructed, the minimum cut $C^{k-1}$ on $G_{k-1}$ is solved. The same uncoarsening procedure may be repeated recursively at the next level until the minimum cut $C^0$ is solved on the banded graph $G^0$, yielding the final segmentation result. It is noted that all graphs at levels k=0, ..., K−1 have a banded graph structure except the graph $G^K$, which is significantly smaller than the full grid graph constructed for the image at the same level.

Modified BGC Process

First, the following graph structures will be used in this algorithm. Let (P,I) be an N-D image on a finite discrete set P with values in $R^N$ and a mapping from this set to a value I(p) in some value space. Here we assume that $I^0=I$ which is the base image. For an image I, one can construct the associated undirected weighted graph G=(V,E,W) consisting of nodes (vertices) v∈V, edges e∈E and non-negative weights w∈W with a specified neighborhood structure. In this setting, each node is identified with one pixel and a 4-connected (6-connected in dimension 3) lattice structure of edges is assumed. For a set of images $\{I^0, \ldots, I^k\}$, a separate graph is constructed for each level, producing a set of graphs $\{G^0=(V^0,E^0,W^0), \ldots, G^k=(V^k,E^k,W^k)\}$.

For an input image, $I^0$, the BGC algorithm produces an image pyramid, $\{I^1, \ldots, I^K\}$ for a predetermined number of levels, K, via downsampling by a factor of two in each dimension, indicated here by the downsampling operation D(·), e.g., $I^1=D(I^0)$. The Graph Cuts algorithm by Y. Boykov and V. Kolmogorov, "An experimental comparison of min-cut/max-flow algorithms for energy minimization in vision" IEEE PAMI 26(9) 2004. 1124-1137 is then applied to the coarsest-level image, $I^K$, to produce a minimum cut on the coarse level that assigns pixels to sets representing foreground, $F^K \subset V^K$, and background, $B^K \subset V^K$, such that $F^K \cup B^K = V^K$ and $F^K \cap B^K = \emptyset$. Let $\partial F^K$ be the boundary of the foreground segmentation defined as $\partial F^K = \{v_i \in F^{K-1} | \exists v_j \in B^{K-1} \text{ s.t.} \|v_i - v_j\| \leq 1\}$, where ∥·∥ is taken to represent a Euclidean distance of the node (pixel) coordinates. This coarse-level segmentation boundary is then upsampled to level (K−1), indicated by the upsampling operation U(·)I e.g., $\partial F^{K-1} = U(\partial F^K)$. This upsampled segmentation boundary is modified by dilating the segmentation boundary by a distance d to include a "band" of unsegmented pixels. The BGC approach then proceeds to treat the inside of the band as foreground seeds and the outside of the band as background seeds and compute the graph cut inside the band. Formally, this may be described by forming three sets of nodes on the coarse level, $F^{*K-1} \subset F^{K-1}$, $B^{*K-1} \subset B^{K-1}$, $Q^{K-1} \subset V^{K-1}$, where $F^{*K-1}$ is the set of foreground nodes on the interior of the band, $B^{*K-1}$ is the set of background nodes outside the band and $Q^{K-1}$ is the set of nodes inside the band (the "questionable", unlabeled, nodes). For a given d, $Q^{K-1} = \{v_i \in V^{K-1} | \exists v_j \in U(\partial F^K) \text{ s.t.} \|v_i - v_j\| \leq d\}$. Note that the (coarsened) locations of the seed pixels are never allowed to belong to the questionable set $Q^k$. The BGC then performs a second max-flow/min-cut computation on $I^{K-1}$ where the nodes in $F^{*K-1}$ are treated as source seeds and the nodes in $B^{*K-1}$ are treated as background seeds. This operation is then continued to the next level until the fine-resolution level is reached and a fine-level segmentation is obtained.

Generation of the Comparison Image

The Laplacian pyramid introduced by Burt, P. J., Adelson, E. H entitled "The Laplacian pyramid as a compact image code. IEEE Transactions on Communications" published in COM-31(4) (1983) 532-540 Burt and Adelson preserves the fine-level detail by storing a second image, $S^k$, defined as $S^k = I^k - U(D(I^k))$. This subtraction, or comparison, image preserves the fine details at level k obscured by the downsampling and upsampling operations. Since this image preserves the fine details, one may employ these values to introduce additional nodes into the band in BGC. Specifically, a threshold, α, is introduced and the definition of $Q^k$ given above is modified for the "band nodes" to state $Q^{*K-1} = \{v_i \in V^{K-1} | S^{K-1}(v_i) \geq \alpha\} \cup Q^{K-1}$ and then remove all the nodes in $Q^{*K-1}$ which are not in the same connected component with the original band $Q^{K-1}$ Here $S^k(v_i)$ is taken to indicate the magnitude of the subtraction image at node (pixel) $v_i$. The parameter a may be interpreted as an "interpolation" parameter between the BGC algorithm (α=∞) and the standard Graph Cuts algorithm (α=0). An setting much closer to BGC preserves the speed advantages of this approach but setting α<∞ allows the recovery of thin structures previously missed in the BGC algorithm. It is noted that the image S need not be computed or stored explicitly, since for each pixel, we can compute the associated Laplacian value online in constant time.

Also assignment of nodes as foreground or background is changed, too. Since the band may disconnect $F^K$ and $B^K$, the final $F^{*K-1}$ and $B^{*K-1}$ are taken as the connected components containing foreground and background seeds respectively.

As noted above, FIG. 3 illustrates the entire process. An initial circle with two thin attached structures (e.g., representing an idealized organ fed with blood vessels) is to be segmented using the indicated seeds. First, this image is coarsened and segmented, but the "vessels" are not properly segmented due to the coarsening process. When upsampling, the band (indicated by a gray crosshatch) is augmented by the pixels crossing threshold α (indicated by the black crosshatch). Now, when the segmentation is performed the "vessels" will be included. More particularly, an initial circle with two thin attached structures (e.g., vessels) is to be segmented using the foreground seeds (red) and background seeds (blue). First, the image/seeds are coarsened, during which the thin structures are lost. The segmentation is then performed on the coarse level. The resulting segmentation is then upsampled and the original BGC band is computed (indicated by the gray crosshatched area). In our approach, this band is augmented to include the thin structures (indicated by the black crosshatched area) as found by pixels with a large magnitude in the difference image of the Laplacian pyramid.

Thus, for a given image, $I_0$, the image pyramid, $\{I_1, \ldots, I_l\}$ is constructed for a predetermined number of levels l. For this purpose, we filtered the image using a Gaussian filter with variance 1.0 and then downsampled by a factor of two. Also, we construct a Laplacian pyramid $\{L_0, L_1, \ldots, L_l\}$ as described in a paper by P. J. Burt and E. H. Adelson entitled "The laplacian pyramid as a compact image code", IEEE Transactions on Communications, 1983. This pyramid is constructed by upsampling each image in the original pyramid by a factor of two and then subtracting it from the corresponding image. An example of the difference (Laplacian) image is shown in FIG. 3 along with the segmentation band construction. The seed locations are also downsampled. After the pyramid is formed, a full grid graph is created for the smallest image in the pyramid, where the graph cut algorithm is performed. Then for each level l−1 to 0 we perform the following operation. The segmentation boundary available at the previous level is projected onto next level and dilated with a fixed amount d. Then, for given thresholds $\alpha_1, \alpha_2$ such that $\alpha_1 > \alpha_2$, we add new pixels to this band as follows. For each point in the band, we mark the point if its absolute Laplacian value is above $\alpha_1$. Then, new points are added to the band if their absolute Laplacian values are above $\alpha_2$ up to a given band size, s. Hence, setting $\alpha_1 = \alpha_2 = 0$ would correspond to dilating the initial band by an amount of s. Therefore, the $\alpha_1, \alpha_2$ and s parameters allow us to make a trade-off between memory/time requirements and segmentation correctness (relative to the full-resolution graph cuts results). After forming the sparse graph, neighboring nodes for foreground and background seeds are found using a flood fill operation, which are then marked as foreground and background nodes. As node weights, the following formulae are used:

$$w_{ij} = \begin{cases} \exp\left(-\frac{(I_i - I_j)^2}{2\sigma^2}\right) / dist(u_i, u_j) & (i, j) \in N \\ +\infty & i = S, j \in F \\ +\infty & i = T, j \in B \\ 0 & \text{otherwise} \end{cases} \quad (1)$$

where N is the set of neighboring nodes, F and B are the set of foreground and background seeds, S and T are the source and sink nodes, and $u_i$ is the position of node i.

A number of embodiments of the invention have been described. Nevertheless, it will be understood that various modifications may be made without departing from the spirit and scope of the invention. Accordingly, other embodiments are within the scope of the following claims.

What is claimed is:

1. A method for segmenting an object of interest from background in a digital image, comprising:
   receiving a high-resolution original digital image, of an object of interest disposed in a background in said image;
   receiving a set of partial labels with some pixels being labeled "object", other pixels being labeled "background", and still other pixels being unlabeled;
   reducing in resolution the partially labeled high-resolution image, both the image intensities and the partial labeling, to a coarse version of both;
   segmenting said reduced resolution image to convert the partial labeling on the reduced resolution image into a full labeling of the reduced resolution image;
   generating from the reduced resolution image, a new, high-resolution image with all pixels therein being labeled as either object or background; and
   segmenting said new, high-resolution image to produce a fully labeled, high-resolution image.

2. The method of claim 1, wherein generating a new, high-resolution image from the reduced resolution image comprises:
   switching the labeling of any pixels near a point where the label is switched from object to background to an become unlabeled pixel; and
   comparing pixels in the new fine-level image to the corresponding pixels in the original image and anywhere there is a significant discrepancy in intensity between the two corresponding pixels, the labeling associated with the pixels is changed to "unlabeled".

3. The method of claim 1, wherein said segmentations are performed using a graph cuts algorithm.

4. A method for segmenting an object of interest from a background in a digital image, comprising:
   receiving an original, high-resolution image of an object of interest disposed in background having seeds on the object being labeled as object pixels, seeds on the background being labeled as background pixels, and with uncertain pixels remaining unlabeled;
   reducing the resolution of the labeled image;
   segmenting the reduced resolution, labeled image;
   producing a band around a fine boundary of the unlabeled pixels;
   labeling all pixels interior to the band as foreground pixels and pixels exterior of the band as background pixels;
   subtracting the labeled image from the original image;
   removing the label of any pixel having a magnitude in the subtracted image that exceeds a predetermined threshold;
   segmenting original image again to label all unlabeled pixels; and
   repeating the above until a predetermined degree of resolution is achieved in an image segmenting the object from the background.

5. The method of claim 4, wherein said segmentations are performed using a graph cuts algorithm.

6. A computer implemented method for segmenting an object of interest from a background, the method performed by the computer comprising the steps of:
   receiving a master, high-resolution digital image of an object disposed within a background;
   applying a first band graph cut process to the master image generating a second image with the object being segmented from the background to a first approximation;
   comparing the second image with the master image to produce a comparison image with pixels identified by the comparison to be background images being removed from the comparison image.

7. A computer implemented method for segmenting an object of interest from a background, the method performed by the computer comprising the steps of:
   generating an original high-resolution image with seeds being placed on the image to indicate regions on an object of interest and background regions;
   reducing the resolution of the original high-resolution image;
   segmenting the reduced resolution image with pixels being labeled to identify a boundary between the object and the background, all pixels interior to a band around the object being labeled as foreground pixels and all pixels exterior to the band being labeled as background pixels and all pixels unknown to be either inside the band or exterior to the band being designated as unlabeled pixels;
   projecting the reduced resolution segmented image with the labeled and unlabeled pixels into a corresponding high-resolution image; and
   comparing the reduced resolution image and original high-resolution image.

8. The method recited in claim 7 wherein the comparing comprises:
   subtracting the reduced resolution image from the original high-resolution image; and
   removing labeled pixels from a resulting, subtracted, image that are outside the bands.

* * * * *